No. 725,503. PATENTED APR. 14, 1903.
J. STRAUSS.
GUN BEARING.
APPLICATION FILED FEB. 19, 1903.
NO MODEL.
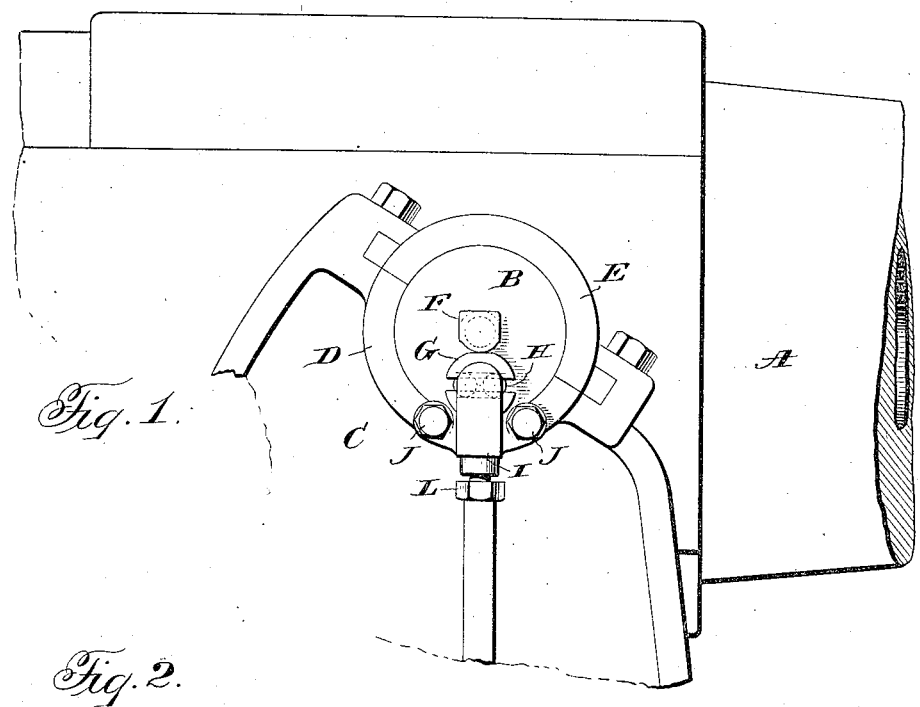
Fig. 1.
Fig. 2.
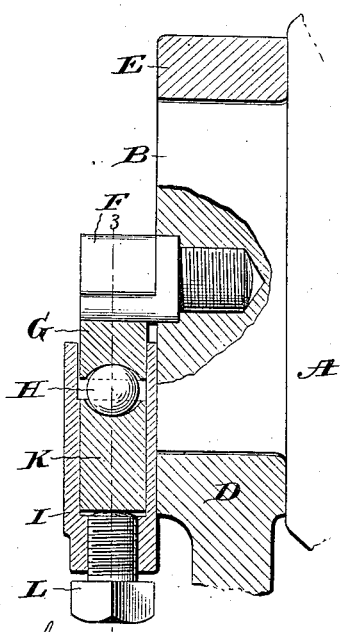
Fig. 3.
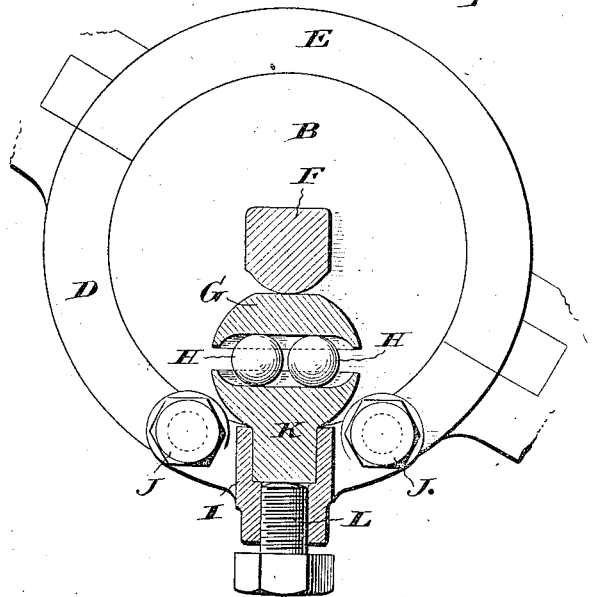
Witnesses:
Jas. E. Hutchinson.
J. L. Lawlor
Inventor.
Joseph Strauss,
by Edwin J. Prindle, Atty.

UNITED STATES PATENT OFFICE.

JOSEPH STRAUSS, OF THE UNITED STATES NAVY.

GUN-BEARING.

SPECIFICATION forming part of Letters Patent No. 725,503, dated April 14, 1903.

Application filed February 19, 1903. Serial No. 144,127. (No model.)

*To all whom it may concern:*

Be it known that I, JOSEPH STRAUSS, of the United States Navy, have invented a certain new and useful Improvement in Gun-Bearings; and I do declare that the following is a full, clear, and exact description thereof, reference being had to the accompanying drawings, in which—

Figure 1 is a side elevation of a portion of a gun and its mount embodying my invention. Fig. 2 is a longitudinal vertical section, on an enlarged scale; and Fig. 3 is a cross-section on the line 3 3 of Fig. 2.

The object of my invention is to provide a gun-bearing having all required capacity for withstanding the shocks and strains of recoil and yet offering a minimum of resistance from friction to the turning of the gun in elevating or depressing it; and to such end my invention consists in the bearing constructed substantially as hereinafter specified.

In the embodiment of my invention illustrated in the drawings there is a gun A, having on each side an ordinary trunnion B and a mount C, having for the trunnion an ordinary bearing comprising the seat portion D and the cap E. Formed on or attached to the trunnion in any preferred way and projecting from the face thereof is a lug F, that forms a supplemental smaller trunnion, whose axis is concentric with that of the trunnion B. Said supplemental trunnion bears upon a block or table G, which rests upon balls, preferably two in number, which are supported by a bracket on the mount C. The table G is given such position vertically that the trunnion B is supported out of contact with its seat D, and as said table is free to move horizontally when power is applied to it by the turning or rolling of the supplemental trunnion F thereon and as said table rests upon the balls H it will be apparent that there will be no sliding friction, but wholly rolling friction, in the moving of the gun to elevate or depress it. The clearance ordinarily left between the usual trunnions and their bearings is sufficient to permit the complete separation of their respective surfaces. The surfaces which the balls engage may be flat or plane; but as I preferably form them they are concave in a direction transverse or crosswise of the gun, the curvature of each surface being on a radius greater than the radius of the ball, so that the ball will have contact with each surface only at a point. By the employment of the concave surfaces the balls naturally tend or gravitate to proper bearing position, and they cannot be expelled or displaced from position as a result of such sidewise movement of the gun as might take place, for the concave surfaces overhang or extend over the sides of the balls. In the direction lengthwise the gun the grooves which are produced by the concavities are closed, so that accidental escape of the balls in this direction is prevented. Balls, especially in contradistinction to rollers, are particularly advantageous in a gun-bearing because of the ease with which they can be retained in place, but specially because no derangement of their position can occur, such as is possible with rollers, which would result in jamming or binding the gun-bearing.

The ball-supporting bracket can be given any desired construction; but I prefer that illustrated, which consists of a plate I, having at opposite sides ears by which it may be fastened by bolts J to the side of the trunnion-seat D and chambered for the reception of a block K, which forms the immediate bearing or support for the balls, and rests at its lower end upon the upper end of an adjusting-screw L. The sides of the plate are extended on opposite sides of the table G to overlap the latter, but without having contact therewith, merely as a means to restrain the accidental displacement of said table. This form of bracket is valuable, since it permits the application of my invention to guns already made, no special structure of the mount being necessary for its adaptation.

Should it be found desirable, as when firing at high angles, to cushion the gun, the block K can rest on a yielding support.

The supplemental trunnion F may be in the form of a cylindrical block, or it can have the form shown, where it has a curved table-engaging surface that has only such angular extent as is necessary for the designed angular motion of the gun, and the radius of the curved surface is preferably such in relation to the number of degrees through which the gun may be elevated as not to produce a very extended horizontal travel of the table G. As shown, the supplemental trunnion is in the form of a piece separate from the main trunnion and having a screw-shank by which it is attached to the latter. Such a construction is useful in adapting my invention to guns already made. If desired, the supplemental trunnion may be simply an extension of the ordinary trunnion without any change of diameter.

The gun in being elevated is supported wholly by the supplemental trunnions and their bearings, so that the movement of the gun can be most easily accomplished; but when the gun is fired the shock of recoil will be sustained by the main trunnions and the mount, the latter trunnions upon recoil being brought against their seats in the mount.

Although I have illustrated and described certain details of construction as characterizing the embodiment of my invention which I have selected for illustration, it is to be understood that unless the claims herein specify the particulars of construction they are not to be limited thereto.

Having thus described my invention, what I claim is—

1. A gun-bearing, comprising a trunnion, a movable bearing-piece adapted to be moved by the revolution of the trunnion, rolling supports for said piece consisting of balls, and means to support the gun under the shock of recoil.

2. A gun-bearing, comprising a trunnion, a movable bearing-piece on which the trunnion rests, balls on which said bearing-piece rests, a relatively movable surface on which said balls bear, and means to support the gun under the shock of recoil.

3. The combination of a gun-trunnion, its seat, an extension of the trunnion having a rounded surface, a table engaged by such surface, balls on which said table rests, and a bearing for the balls.

4. A gun-bearing, comprising a trunnion, a movable bearing-piece adapted to be moved by the revolution of the trunnion, rolling supports for said piece consisting of balls, the surface of said piece next the balls being grooved, and means to support the gun under the shock of recoil.

5. A gun-bearing, comprising a trunnion, a movable bearing-piece on which the trunnion rests, balls on which said bearing-piece rests, a bracket supporting the balls, the ball-engaging surfaces of the piece and bracket having grooves that extend lengthwise of the gun, and means to support the gun under the shock of recoil.

6. The combination of a gun-trunnion, its seat, a movable bearing-piece adapted to be moved by the revolution of the trunnion, rolling supports for said piece, and a bracket attached to the side of the trunnion-seat for supporting the rolling supports.

7. A gun, comprising a trunnion, a movable bearing-piece adapted to be moved by the revolution of the trunnion, rolling supports for said piece, a block on which the supports rest, a chambered bracket for said block, and an adjustable support for the block.

8. A gun, comprising a trunnion, a movable bearing-piece adapted to be moved by the revolution of the trunnion, rolling supports for said piece, a block on which the supports rest, a chambered bracket for the block, having surfaces that project alongside of said movable bearing-piece.

In testimony that I claim the foregoing I have hereunto set my hand.

JOSEPH STRAUSS.

Witnesses:
W. E. WRIGHT,
EDWIN J. PRINDLE.